(12) United States Patent
Kameda

(10) Patent No.: US 11,223,427 B2
(45) Date of Patent: Jan. 11, 2022

(54) OPTICAL SUBMARINE CABLE SYSTEM AND OPTICAL SUBMARINE RELAY APPARATUS

(71) Applicant: NEC Corporation, Tokyo (JP)

(72) Inventor: Shingo Kameda, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 16/487,149

(22) PCT Filed: Mar. 9, 2018

(86) PCT No.: PCT/JP2018/009238
§ 371 (c)(1),
(2) Date: Aug. 20, 2019

(87) PCT Pub. No.: WO2018/168696
PCT Pub. Date: Sep. 20, 2018

(65) Prior Publication Data
US 2020/0059303 A1    Feb. 20, 2020

(30) Foreign Application Priority Data
Mar. 17, 2017   (JP) .............................. JP2017-052921

(51) Int. Cl.
*H04B 10/00* (2013.01)
*H04B 10/80* (2013.01)
(Continued)

(52) U.S. Cl.
CPC ......... *H04B 10/806* (2013.01); *H04B 10/291* (2013.01); *H04B 10/503* (2013.01)

(58) Field of Classification Search
USPC ................................................ 398/173–181
See application file for complete search history.

(56) References Cited

U.S. PATENT DOCUMENTS 4,879,762 A * 11/1989 Hanyuda ........... H02M 3/33569
                                                    398/175
5,479,423 A * 12/1995 Tanikawa ........... H04B 10/2912
                                                    359/337
(Continued)

FOREIGN PATENT DOCUMENTS

CN    102934377 A    2/2013
CN    105474552 A    4/2016
(Continued)

OTHER PUBLICATIONS

International Search Report for PCT Application No. PCT/JP2018/009238, dated Jun. 5, 2018.
(Continued)

Primary Examiner — Agustin Bello
(74) Attorney, Agent, or Firm — Sughrue Mion, PLLC

(57) ABSTRACT

When, in each of optical submarine relay apparatuses of the optical submarine cable system in which the optical submarine relay apparatus is arranged in each relay section of an optical submarine cable, a Laser Diode (LD) driving device for excitation (11) for outputting an excitation light to excite an optical amplifier is configured to include a plurality of LD driving circuits whose requiring currents are different from one another, which are, for example, a first LD driving circuit (111a) of a required current Ia and a second LD driving circuit (111b) of a required current (Ib) therein, a power feeding line for feeing power to the first LD driving circuit (111a) and a power feeding line for feeing power to the second LD driving circuit (111b) are configured to be connected in parallel to each other.

8 Claims, 10 Drawing Sheets

(51) Int. Cl.
*H04B 10/291* (2013.01)
*H04B 10/50* (2013.01)

(56) References Cited

U.S. PATENT DOCUMENTS

| | | | | |
|---|---|---|---|---|
| 5,859,938 A * | 1/1999 | Nabeyama | H04B 10/2912 | 385/24 |
| 6,049,417 A * | 4/2000 | Srivastava | H01S 3/06754 | 359/337.4 |
| 6,188,510 B1 * | 2/2001 | Edagawa | H04B 10/298 | 359/341.33 |
| 6,204,960 B1 * | 3/2001 | Desurvire | H04B 10/25077 | 359/337 |
| 6,292,288 B1 * | 9/2001 | Akasaka | H01S 3/06754 | 359/334 |
| 6,335,823 B2 * | 1/2002 | Ohshima | H01S 3/06754 | 359/341.32 |
| 6,614,588 B1 * | 9/2003 | Uemura | H04B 10/808 | 359/341.4 |
| 6,678,088 B1 * | 1/2004 | Stummer | H04B 10/296 | 359/341.41 |
| 6,714,394 B1 * | 3/2004 | Kumayasu | H04B 10/806 | 361/62 |
| 7,539,413 B2 * | 5/2009 | Munehira | H04B 10/0771 | 398/167 |
| 7,574,140 B2 * | 8/2009 | Manna | H04B 10/2935 | 398/105 |
| 9,143,845 B2 * | 9/2015 | Aida | H04Q 11/0005 | |
| 9,755,734 B1 * | 9/2017 | Vusirikala | H04B 10/0771 | |
| 10,110,321 B2 * | 10/2018 | Muth | H04J 14/0202 | |
| 2001/0003486 A1 * | 6/2001 | Mikami | H04B 10/2916 | 398/146 |
| 2001/0019448 A1 * | 9/2001 | Yokoyama | H04B 10/2916 | 359/334 |
| 2002/0021473 A1 * | 2/2002 | Kasahara | H04B 10/291 | 398/181 |
| 2002/0057477 A1 * | 5/2002 | Rocca | H04Q 11/0062 | 398/104 |
| 2002/0122242 A1 * | 9/2002 | Shimojoh | H04B 10/2931 | 359/334 |
| 2002/0167722 A1 * | 11/2002 | Willner | H01S 3/0675 | 359/349 |
| 2003/0002117 A1 * | 1/2003 | Naik | H04B 10/299 | 398/178 |
| 2003/0011879 A1 * | 1/2003 | Kasahara | H04B 10/0777 | 359/341.4 |
| 2003/0015921 A1 * | 1/2003 | Kumayasu | H04B 3/44 | 307/131 |
| 2003/0020995 A1 * | 1/2003 | Harasawa | H04B 10/2916 | 398/178 |
| 2003/0067671 A1 * | 4/2003 | Islam | H04B 10/296 | 359/337 |
| 2003/0072062 A1 * | 4/2003 | Pedersen | H04B 10/2916 | 398/181 |
| 2003/0108315 A1 * | 6/2003 | Kubo | G02B 6/29377 | 385/123 |
| 2003/0108351 A1 * | 6/2003 | Feinberg | H04B 10/808 | 398/34 |
| 2003/0174954 A1 | 9/2003 | Hamamoto et al. | | |
| 2004/0027649 A1 * | 2/2004 | Yokoyama | H04B 10/2916 | 359/334 |
| 2004/0114213 A1 * | 6/2004 | Yamaguchi | H01S 3/13013 | 359/341.3 |
| 2004/0240045 A1 * | 12/2004 | Lee | H01S 3/094003 | 359/349 |
| 2005/0018726 A1 * | 1/2005 | Dinger | H05B 45/48 | 372/38.09 |
| 2005/0036790 A1 * | 2/2005 | Tanaka | H01S 3/302 | 398/177 |
| 2005/0094255 A1 * | 5/2005 | Stephens | H04B 10/2916 | 359/337.5 |
| 2005/0259990 A1 * | 11/2005 | Yokota | H04B 10/2937 | 398/92 |
| 2006/0098270 A1 * | 5/2006 | Harada | H04B 10/2931 | 359/337 |
| 2006/0140633 A1 * | 6/2006 | Chaput | H04B 10/298 | 398/92 |
| 2007/0268569 A1 * | 11/2007 | Muro | H04B 10/2916 | 359/334 |
| 2008/0013161 A1 * | 1/2008 | Tokura | H01S 3/302 | 359/334 |
| 2008/0049303 A1 * | 2/2008 | Nakata | H01S 3/302 | 359/334 |
| 2008/0050121 A1 * | 2/2008 | Evangelides | H04B 10/2935 | 398/105 |
| 2010/0073762 A1 * | 3/2010 | Onaka | H01S 3/302 | 359/334 |
| 2010/0129081 A1 * | 5/2010 | Onaka | H04J 14/0221 | 398/81 |
| 2010/0209110 A1 * | 8/2010 | Pelouch | H04J 14/0279 | 398/92 |
| 2011/0141552 A1 * | 6/2011 | Ghera | H04B 10/2916 | 359/334 |
| 2014/0103739 A1 * | 4/2014 | Takigawa | H02J 4/00 | 307/112 |
| 2014/0199083 A1 * | 7/2014 | Willoughby | H04J 14/02 | 398/180 |
| 2014/0270757 A1 * | 9/2014 | Lochem | H04J 14/0227 | 398/34 |
| 2015/0048238 A1 * | 2/2015 | Kawai | H01S 3/09408 | 250/205 |
| 2016/0028209 A1 * | 1/2016 | Kawai | H01S 3/09415 | 372/6 |
| 2016/0261349 A1 * | 9/2016 | Chang | H04B 10/2916 | |
| 2019/0089117 A1 * | 3/2019 | Nakamura | H04B 10/25 | |
| 2019/0348812 A1 * | 11/2019 | Kawai | H01S 3/094061 | |
| 2020/0059303 A1 * | 2/2020 | Kameda | H04B 10/291 | |

FOREIGN PATENT DOCUMENTS

| | | |
|---|---|---|
| EP | 1220468 A1 | 7/2002 |
| JP | H05-190946 A | 7/1993 |
| JP | H06-315012 A | 11/1994 |
| JP | 2003-032201 A | 1/2003 |
| JP | 2003-273462 A | 9/2003 |
| WO | 2008/068842 A1 | 6/2008 |
| WO | 2014/034073 A1 | 3/2014 |
| WO | 2014/208048 A1 | 12/2014 |

OTHER PUBLICATIONS

Extended European Search Report for EP Application No. EP18768571.4 dated Feb. 17, 2020.

Chinese Office Action for CN Application No. 201880016239.4 dated Nov. 1, 2021 with English Translation.

* cited by examiner

OPTICAL SUBMARINE CABLE SYSTEM AND OPTICAL SUBMARINE RELAY APPARATUS

This application is a National Stage Entry of PCT/JP2018/009238 filed on Mar. 9, 2018, which claims priority from Japanese Patent Application 2017-052921 filed on Mar. 17, 2017, the contents of all of which are incorporated herein by reference, in their entirety.

TECHNICAL FIELD

The present disclosure relates to an optical submarine cable system, and an optical submarine relay apparatus that is provided in the optical submarine cable system, an optical direct amplification technology being employed in the optical submarine relay apparatus.

BACKGROUND ART

In recent years, in the field of optical submarine cable system, an optical submarine relay apparatus in which an excitation laser technology using Laser Diode (LD: semiconductor laser) and an optical direct amplification technology using Erbium-Doped Fiber (EDF) are employed has been introduced. Further, by combining the above technologies with a wavelength division multiplex transmission technology, a large capacity optical submarine cable system has been put to practical use. Therefore, it becomes possible to dramatically increase the transmittable capacity per optical submarine cable, and the large capacity optical submarine cable system has become indispensable as the backbone of a communication system supporting international large capacity data transmission including the Internet.

FIG. 6A is a configuration diagram showing a configuration of a currently used optical submarine cable system that relates to the present disclosure. FIG. 6B shows an internal configuration of an optical submarine relay apparatus 10M, and a circuit configuration of an LD driving device for excitation 11M in the optical submarine relay apparatus 10M. The LD driving device for excitation 11M outputs an optical signal for exciting an optical amplifier (EDFA: Erbium-Doped Fiber Amplifier).

As shown in FIG. 6A, the optical submarine cable system is composed of an optical submarine cable 20M installed on the sea bottom in such a way that it allows land terminal equipment devices 30M to be connected to each other in order to enable optical communication between the land terminal equipment devices 30M to be performed, the land terminal equipment devices 30M being arranged on land in such a way that they are opposed to each other, and one or more optical submarine relay apparatuses 10M being arranged in multiple stages in each relay section of the optical submarine cable 20M.

In FIG. 6A, in order to supply power to each of the optical submarine relay apparatuses 10M arranged on the sea bottom, a power feeding equipment (PFE) is arranged as a current source in the land terminal equipment device 30M, and a power feeding line from the power feeding equipment is connected in series to each of the optical submarine relay apparatuses 10M along with optical fibers for optical signal transmission as the optical submarine cable 20M.

Further, as shown in FIG. 6B, each of the optical submarine relay apparatuses 10M is configured to include an LD driving device for excitation 11M, a multiplexer 12M, and an optical amplifier (EDFA) 13M. The LD driving device for excitation 11M outputs an excitation light for excitation and driving for the optical amplifier 13M. The multiplexer 12M multiplexes a wavelength multiplexed optical signal input from an optical fiber as an optical signal, the wavelength of which having been multiplexed, with the excitation light for excitation and driving, drives the optical amplifier 13M, excites and amplifies the input wavelength multiplexed optical signal by the optical amplifier 13M, and outputs the resulting signal.

As shown in the internal configuration block diagram under the block of the optical submarine relay apparatus 10M in FIG. 6B, the LD driving device for excitation 11M is composed of an LD driving circuit 111M and a constant voltage supply circuit 112M. The LD driving circuit 111M drives a Laser Diode (LD: a semiconductor laser) and outputs a predetermined excitation light for exciting and driving the optical amplifier 13M. Power is required to drive this LD. Further, the constant voltage supply circuit 112M is a circuit for causing, when a system current $I_4$ fed from the power feeding equipment in the land terminal equipment device 30M exceeds the total required current amount that is required to drive the LD driving circuit 111M, this excessive current to flow through the constant voltage supply circuit 112M by bypass. The constant voltage supply circuit 112M is connected in parallel to the LD driving circuit 111M in such a way that this excessive current is made to flow through the constant voltage supply circuit 112M.

Here, a plurality of LD driving devices for excitation 11M for exciting and driving the optical amplifier 13M are preferably arranged in each of the optical submarine relay apparatuses 10M, as shown in FIG. 7, for the following reasons.

(1) In order to improve reliability of the optical submarine cable system, it is preferable to make the configuration of the LD driving device for excitation 11M redundant, as disclosed, for example, in Patent Literature 1, which is International Patent Publication No. WO 2014/208048.

(2) In order to increase the transmission capacity of the optical submarine cable system, it is preferable to construct an optical submarine cable system in which a plurality of optical submarine transmission systems (transmission systems including a combination of two optical fibers for bi-directional transmission×the number of systems) are arranged in parallel with each other.

(3) Further, in recent years, in accordance with an increase in the transmission capacity of optical submarine cable systems, it has been studied how to improve the efficiency of optical fibers by using, besides a wavelength band of a C band that is being used in the currently used optical communication, an L band whose wavelength is longer than that of the C band, and it is preferable to construct an optical submarine cable system targeted for a plurality of optical signals of different bands.

FIG. 7 is a configuration diagram showing an internal configuration different from that shown in FIG. 6B of the optical submarine relay apparatus forming the currently used optical submarine cable system that relates to the present disclosure, and shows a configuration in a case in which a plurality of multiplexers, a plurality of LD driving devices for excitation, and a plurality of optical amplifiers are included in each optical submarine relay apparatus. The configuration example shown in FIG. 7 illustrates a case in which a first series of a (C+L) band configuration in which optical signals of the wavelength band of the C band and the wavelength band of the L band are both used is included, a second series of an optical transmission system that is different from that of the first series is included, and a duplex configuration in which each of the first series and the second series is made redundant is employed.

That is, an optical submarine relay apparatus 10N shown in FIG. 7 includes, as the first series, a duplex configuration of an LD driving device for excitation 11Na1 and an LD driving device for excitation 11Nb1 for exciting the C band and the L band, a multiplexer 12Nab1 for multiplexing and demultiplexing the excitation light of the C band and the L band from one of the LD driving device for excitation 11Na1 and the LD driving device for excitation 11Nb1, a multiplexer 12NC and an optical amplifier 13NC for a C band, and a multiplexer 12NL and an optical amplifier 13NL for an L band. Further, the optical submarine relay apparatus 10N shown in FIG. 7 includes, as the second series, a duplex configuration of an LD driving device for excitation 11Na2 and an LD driving device for excitation 11Nb2 for outputting two excitation light beams of an optical transmission system other than the C band and the L band, a multiplexer 12Nab2 for multiplexing and demultiplexing the two excitation light beams from one of the LD driving device for excitation 11Na2 and the LD driving device for excitation 11Nb2, a multiplexer 12NX and an optical amplifier 13NX for one excitation light, and a multiplexer 12NY and an optical amplifier 13NY for the other excitation light.

CITATION LIST

Patent Literature

[Patent Literature 1] International Patent Publication No. WO 2014/208048

SUMMARY OF INVENTION

Technical Problem

With the rapid spread of the Internet in recent years, demands for long distance and large capacity communication has been increasing more and more. A submarine cable system is no exception as regards such demands. It is required to achieve long distance communication while the current supply amount of a Power Feeding Equipment (PFE) is fixed. In order to achieve the long distance communication, it has been strongly required to reduce a consumption current in the optical submarine relay apparatus.

In the currently used optical submarine cable system that relates to the present disclosure described above, however, it is difficult to reduce the excessive current that flows through the constant voltage supply circuit in the optical submarine relay apparatus. In the optical submarine relay apparatus having a (C+L) band configuration in which the wavelength band of the C band and the wavelength band of the L band are both used as illustrated, for example, in FIG. 7, a required current value $I_C$ required to drive the LD driving circuit that is used to excite the C band and a required current value $I_L$ required to drive the LD driving circuit that is used to excite the L band are different from each other. As shown in FIG. 7, the optical amplifier for the C band and the optical amplifier for the L band are arranged on optical fibers different from each other.

That is, typically, the LD driving circuit for the L band whose wavelength is larger than that of the C band tends to require more current than the LD driving circuit for the C band does. As a result, in the optical submarine cable system in which a current is supplied in series from the power feeding equipment on land via the optical submarine cable, when a current is supplied, for example, to the LD driving circuit for the L band and the LD driving circuit for the C band included in the LD driving device for excitation 11Na1 shown in FIG. 7 in series, for example, an excessive current $I_S$ flows through a constant voltage supply circuit 112C for the C band due to the difference between the consumption current $I_L$ that flows through the load of the LD driving circuit 111L for the L band and the consumption current $I_C$ that flows through the load of the LD driving circuit 111C for the C band, as shown in FIG. 8. Therefore, there is a disadvantage that it is impossible to sufficiently reduce the current in the optical submarine relay apparatus. FIG. 8 is an explanatory diagram for explaining a problem in the current technology of the optical submarine relay apparatus having a (C+L) band configuration in which the wavelength band of the C band and the wavelength band of the L band are both used. That is, FIG. 8 illustrates a problem of the connection configuration of the power feeding line in the LD driving device for excitation of the optical submarine relay apparatus in the current technology taking a connection configuration of a power feeding line to the LD driving circuit for excitation of each of the wavelength band of the C band and the wavelength band of the L band as an example.

Now, with reference to the explanatory diagram shown in FIG. 8, the excessive current in the optical submarine repeater will be explained supplementarily. As described above, a current for driving the optical submarine repeater is fed from the power feeding equipment in the land terminal equipment device via the optical submarine cable as the system current. When the consumption current that flows through the LD driving circuit 111L for the L band is denoted by $I_L$ and the consumption current that flows through the LD driving circuit 111C for the C band is denoted by $I_C$ ($I_L > I_C$) in the connection configuration as shown in FIG. 8, the system current $I_A$ fed from the power feeding equipment in the land terminal equipment device via the optical submarine cable is set to the one expressed by the following equation.

$$I_A = I_L$$

Therefore, while an excessive current that flows through a constant voltage supply circuit 112L connected in parallel to the LD driving circuit 111L for the L band does not occur, a current given by the following equation flows through the constant voltage supply circuit 112C connected in parallel to the LD driving circuit 111C for the C band as an excessive current $I_S$.

$$I_S = I_L - I_C$$

Object of Present Disclosure

The present disclosure has been made in order to solve the aforementioned problem and aims to provide an optical submarine cable system and an optical submarine relay apparatus capable of efficiently supplying a current while suppressing an excessive current even in a configuration provided with a plurality of LD driving circuits that require electric currents different from one another.

Solution to Problem

In order to solve the aforementioned problem, the optical submarine cable system and the optical submarine relay apparatus according to the present disclosure mainly employs the following characteristic configurations.

(1) In an optical submarine cable system according to the present disclosure, an optical submarine relay apparatus is arranged in each relay section of an optical submarine cable, the optical submarine relay apparatus includes an optical amplifier and a Laser Diode (LD) driving device for excitation configured to output an excitation light for exciting the optical amplifier, and the LD driving device for excitation includes a plurality of LD driving circuits, and power feeding lines for feeding power to the plurality of respective LD driving circuits are connected in parallel to one another.

(2) In an optimal submarine relay apparatus according to the present disclosure, the optical submarine relay apparatus is arranged in each relay section of an optical submarine cable in an optical submarine cable system, the optical submarine relay apparatus includes an optical amplifier and a Laser Diode (LD) driving device for excitation for outputting an excitation light for exciting the optical amplifier, and the LD driving device for excitation includes a plurality of LD driving circuits, and power feeding lines for feeding power to the plurality of respective LD driving circuits are connected in parallel to one another.

Advantageous Effects of Invention

According to the optical submarine cable system and the optical submarine relay apparatus of the present disclosure, the following effects may be obtained.

That is, in the present disclosure, even when a plurality of LD driving circuits whose required currents are different from one another are arranged in the optical submarine relay apparatus, it becomes possible to efficiently supply a current while preventing an excessive current from being generated and to reduce the required currents for the whole optical submarine cable system. The reason for it is that, when a plurality of LD driving circuits whose required currents that are necessary to drive them are different from one another are arranged in the optical submarine relay apparatus, a configuration in which connection paths of power feeding lines for the respective LD driving circuits are connected in parallel to one another is employed.

DESCRIPTION OF EMBODIMENTS

Figure 1:
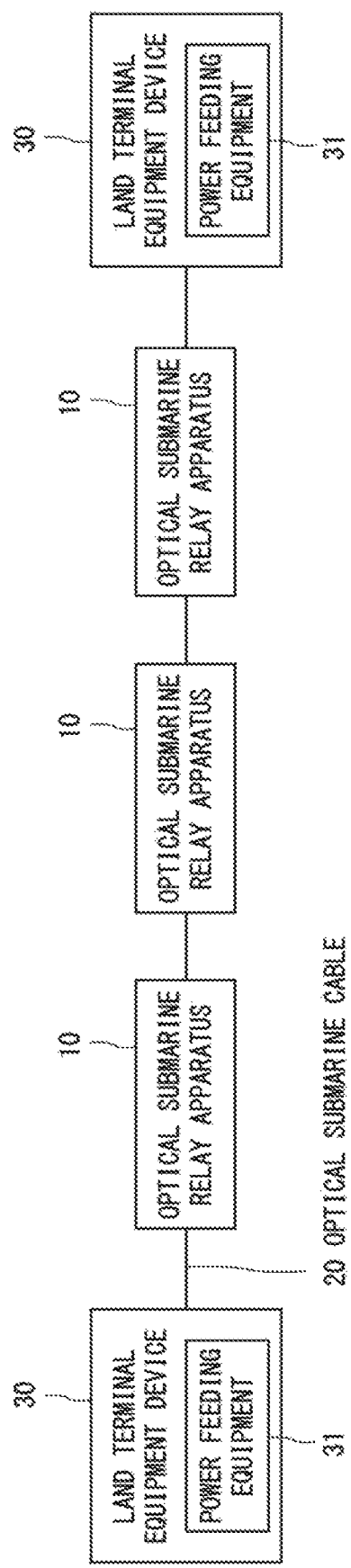
FIG. 1 is a configuration diagram showing a configuration example of an optical submarine cable system according to the present disclosure.

In the following description, with reference to the accompanying drawings, preferred example embodiments of an optical submarine cable system and an optical submarine relay apparatus according to the present disclosure will be explained. It is needless to say that the reference symbols of the following drawings attached to these drawings are added for convenience as an example to facilitate understanding and are not intended to limit the present disclosure to the aspects shown in the drawings.

(Features of Present Disclosure)

Prior to giving the description of example embodiments of the present disclosure, the outline of the features of the present disclosure will be explained first. One of the main features of the present disclosure is an optical submarine relay apparatus including a plurality of LD driving circuits whose required currents that are required to output excitation light beams to a plurality of respective optical amplifiers are different from one another, in which power feeding lines of the plurality of LD driving circuits are connected in parallel to one another and the plurality of LD driving devices are concurrently driven. Accordingly, it is possible to efficiently use the required currents that are necessary, that is, system currents, as the whole optical submarine cable system including the optical submarine relay apparatus, and to prevent a wasteful current from being consumed.

Figure 8:
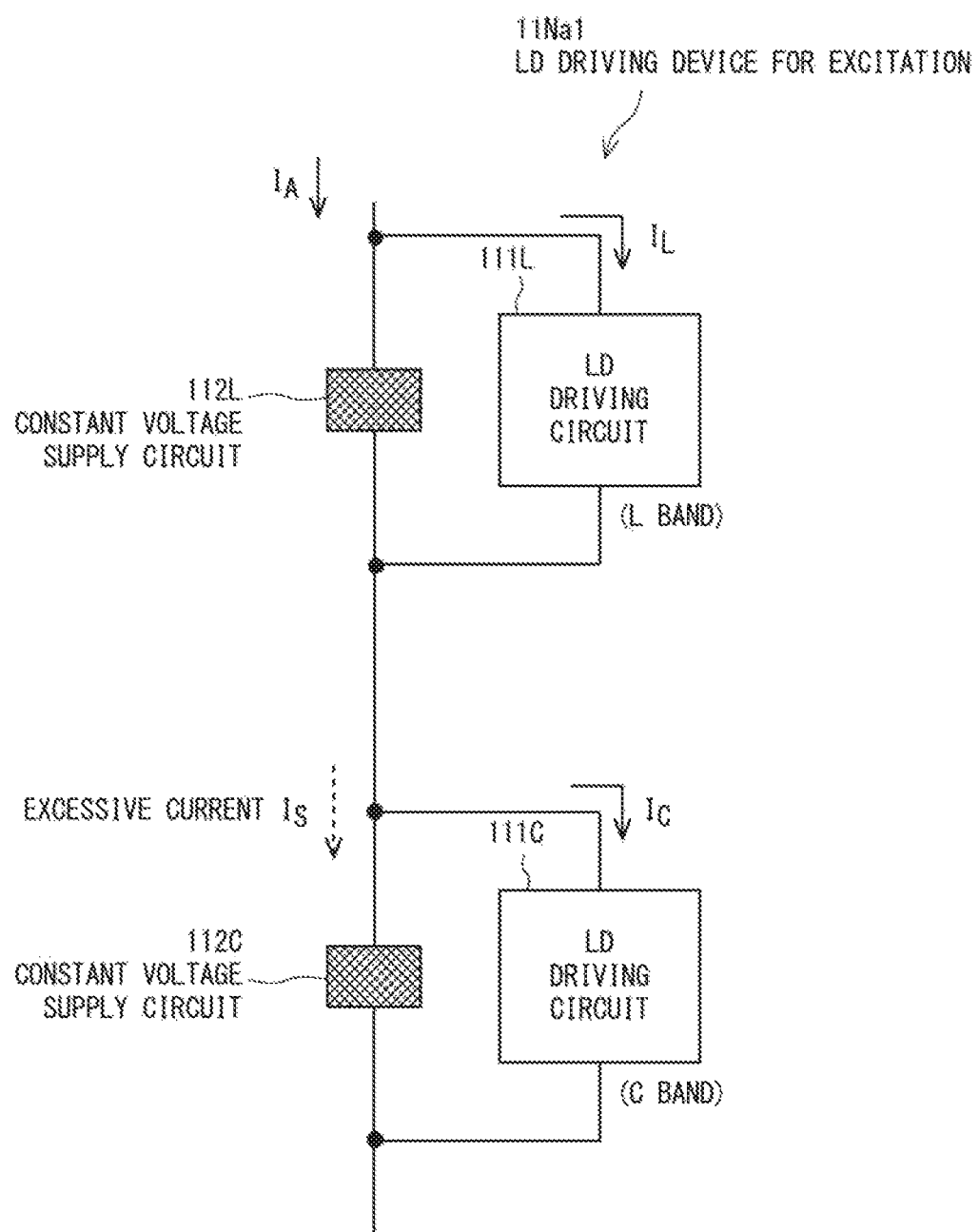
FIG. 8 is an explanatory diagram for describing a problem in a current technology of an optical submarine relay apparatus having a (C+L) band configuration in which a wavelength band of a C band and a wavelength band of an L band are both used.

In an optical submarine relay apparatus having a (C+L) band configuration in which a wavelength band of a C band and a wavelength band of an L band are both used, for example, in the current technology related to the present disclosure, as shown in FIG. 8, a connection configuration in which the power feeding line of the LD driving circuit for excitation 111L of the L band and that of the LD driving circuit for excitation 111C of the C band are connected in series is used.

As a result, as described above, when the consumption current that flows through the LD driving circuit for excitation 111L of the L band is denoted by $I_L$ and the consumption current that flows through the LD driving circuit for excitation 111C of the C band is denoted by $I_C$ ($I_L > I_C$), the system current $I_A$ fed from the power feeding equipment on land via the optical submarine cable is set to the one expressed by the following equation.

$$I_A = I_L$$

Therefore, while an excessive current does not flow through a constant voltage supply circuit 112L connected in parallel to the LD driving circuit for excitation 111L of the L band, the current given by the following equation flows through the constant voltage supply circuit 112C connected in parallel to the LD driving circuit for excitation 111C of the C band as the excessive current $I_S$.

$$I_S = I_L - I_C$$

On the other hand, in the present disclosure, for any one of the optical submarine relay apparatuses that are installed for each relay section of the optical submarine cable, a connection configuration in which the power feeding line of the LD driving circuit for excitation 111L of the L band and that of the LD driving circuit for excitation 111C of the C band are connected in parallel to each other is employed. Therefore, the system current $I_A$ fed from the power feeding equipment on land via the optical submarine cable is set to the one expressed by the following equation.

$$I_A = I_L + I_C$$

As a result, in any optical submarine relay apparatus to which the optical submarine cable is connected, unlike the case shown in FIG. 8, the consumption current $I_L$ and the consumption current $I_C$ respectively flow through the LD driving circuit 111L for the L band and the LD driving circuit 111C for the C band that are connected in parallel to each other in the LD driving device for excitation, and an excessive current that flows through the constant voltage supply circuit does not occur. Therefore, it is possible to efficiently utilize the system current of the optical submarine cable system and to reduce the required current for the whole optical submarine cable system.

Example Embodiments of Present Disclosure

Next, with reference to the drawings, one example of example embodiments of the optical submarine cable system and the optical submarine relay apparatus according to the present disclosure will be explained. FIG. 1 is a configuration diagram showing a configuration example of the optical submarine cable system according to the present disclosure, and has a configuration the same as that shown in FIG. 6A as the current technology related to the present disclosure. That is, as shown in FIG. 1, the optical submarine cable system is composed of an optical submarine cable 20 installed on the sea bottom in such a way that it allows two land terminal equipment devices 30 to be connected to each other in order to enable optical communication between the land terminal equipment devices 30 to be performed, the land terminal equipment devices 30 being arranged on land in such a way that they are opposed to each other, and one or more optical submarine relay apparatuses 10 arranged in multiple stages for each relay section of the optical submarine cable 20. In the optical submarine cable system shown in FIG. 1, a wavelength multiplexed optical signal input from the land terminal equipment device 30 is transmitted to the opposing land terminal equipment device 30 while repeating excitation and amplification by the optical submarine relay apparatuses 10 connected in multiple stages at appropriate intervals on the optical submarine cable 20.

Figure 6A:
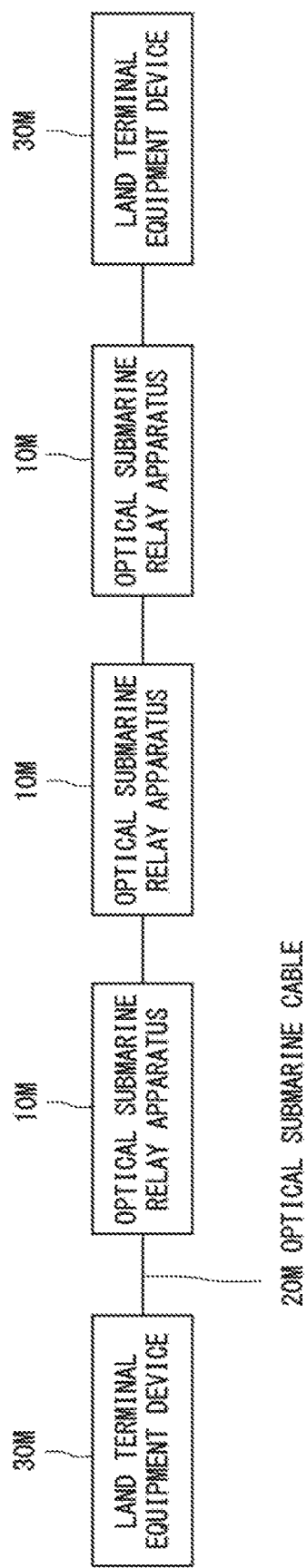
FIG. 6A is a configuration diagram showing a configuration of a currently used optical submarine cable system that relates to the present disclosure.
Figure 6B:
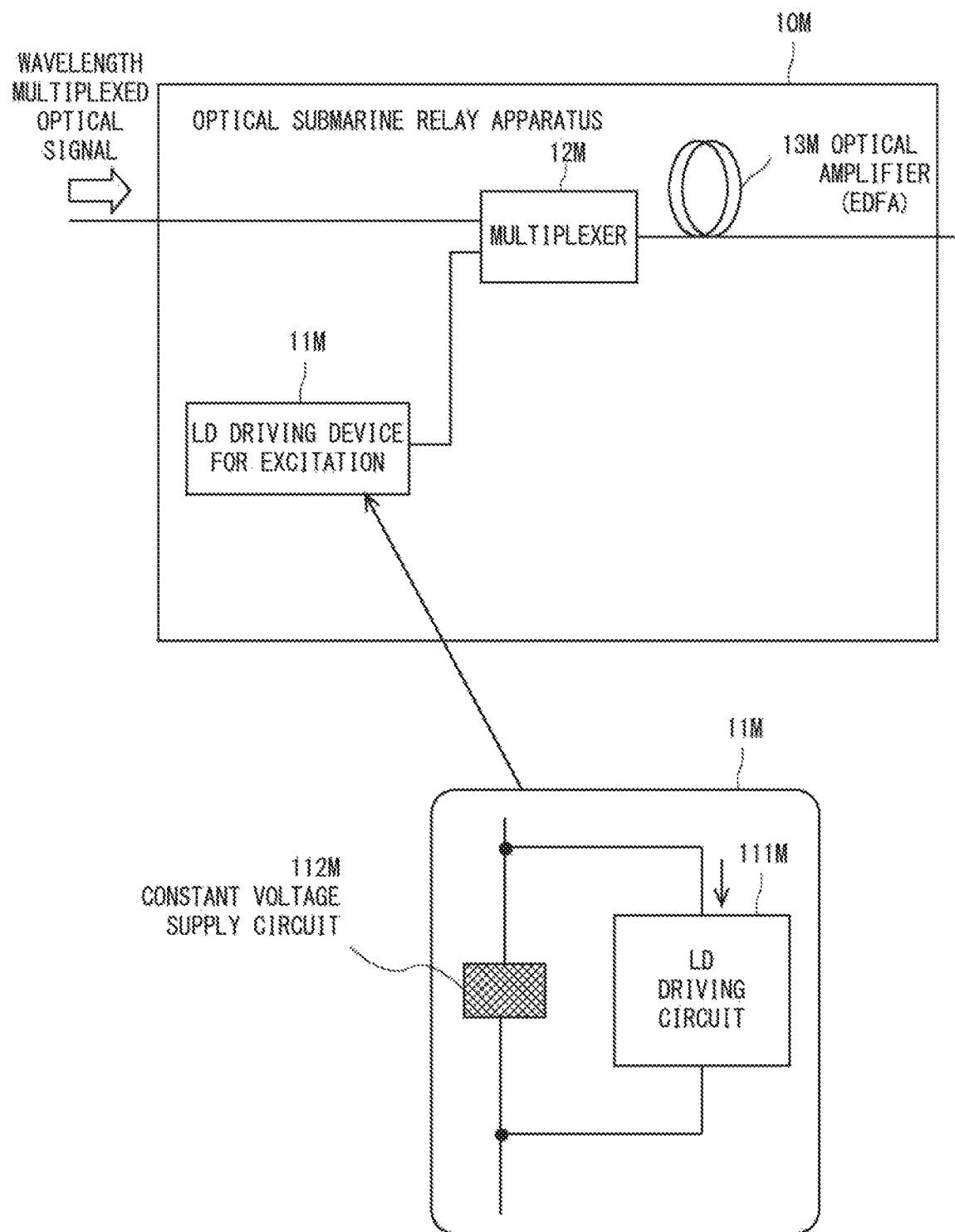
FIG. 6B is a diagram showing an internal configuration of an optical submarine relay apparatus 10M in the optical submarine cable system shown in FIG. 6A and a circuit configuration of the LD driving device for excitation in the optical submarine relay apparatus 10M.
Figure 7:
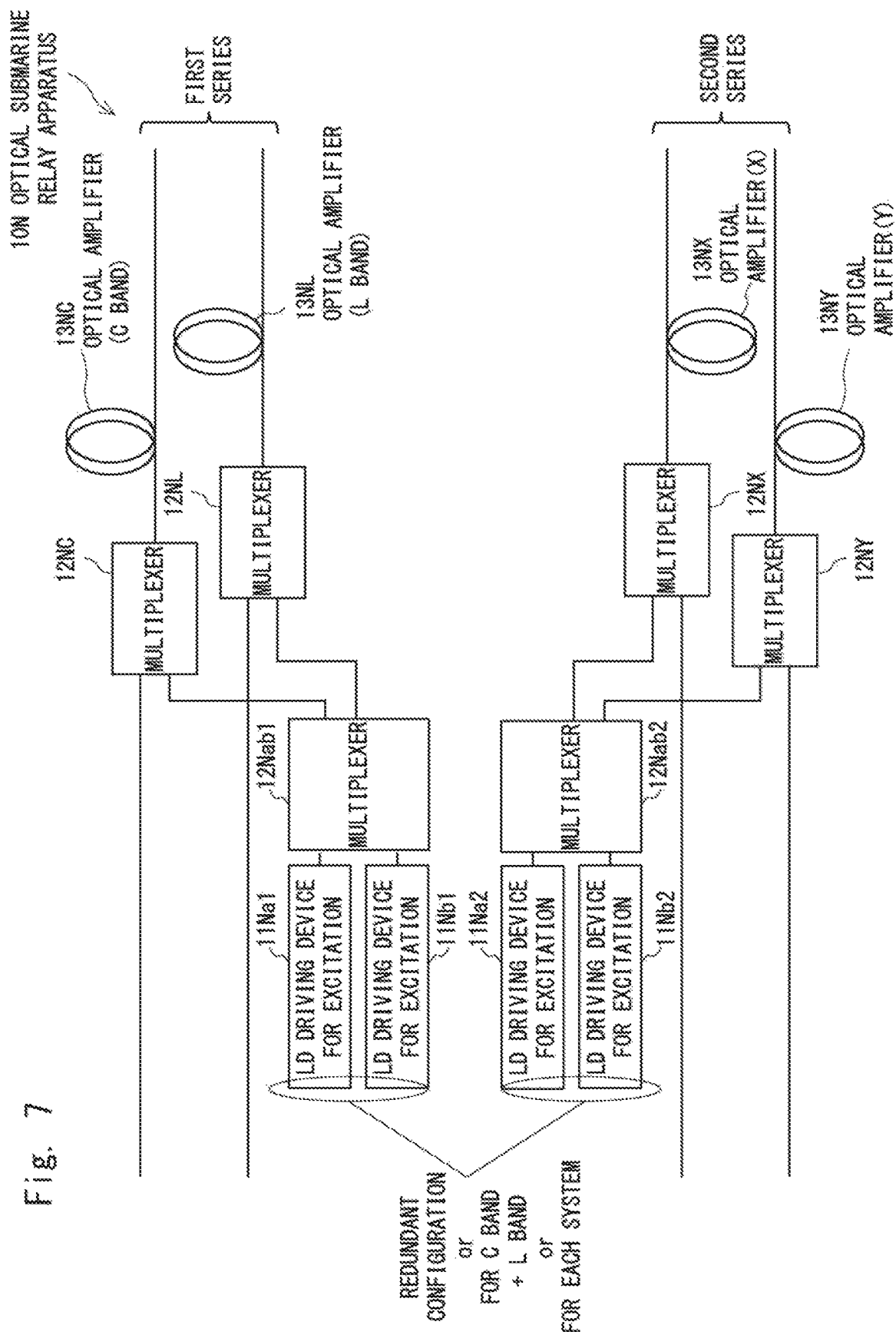
FIG. 7 is a configuration diagram showing an internal configuration different from that shown in FIG. 6B of the optical submarine relay apparatus that configures the currently used optical submarine cable system that relates to the present disclosure.

Then in order to supply power to each of the optical submarine relay apparatuses 10 installed on the sea bottom, similar to a case shown in FIG. 6A, a Power Feeding Equipment (PFE) 31 is arranged in the land terminal equipment device 30 as a current source, and the power feeding line from this power feeding equipment 31 is connected in series with each of the optical submarine relay apparatuses 10 as the optical submarine cable 20 along with optical fibers for optical signal transmission. While the case in which the power feeding equipment 31 is provided in the land terminal equipment device 30 has been shown in FIG. 1, the power feeding equipment 31 may be provided separately from the land terminal equipment device 30.

Figure 2:
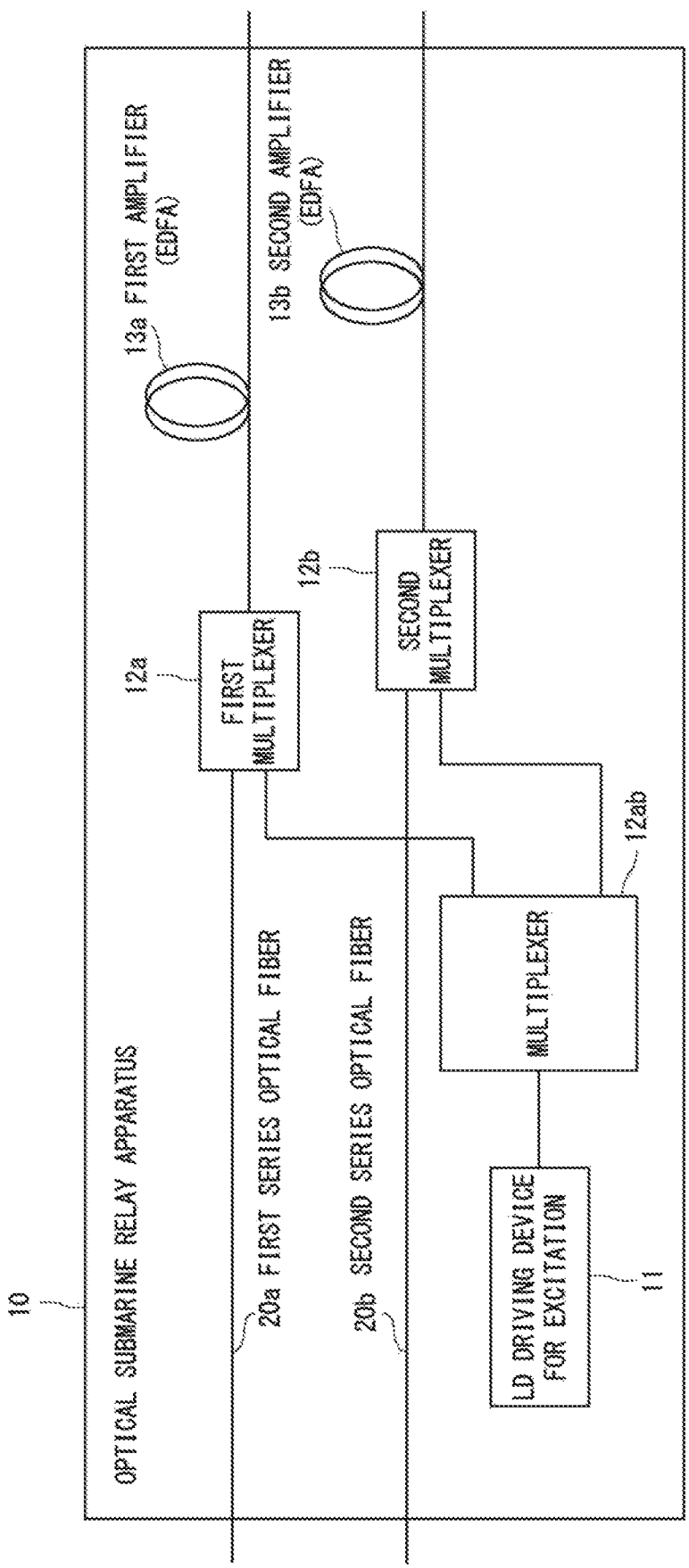
FIG. 2 is a block configuration diagram showing one example of an internal configuration of an optical submarine relay apparatus shown in FIG. 1.

Next, an example of an internal configuration of the optical submarine relay apparatus 10 shown in FIG. 1 will be explained. FIG. 2 is a block configuration diagram showing one example of the internal configuration of the optical submarine relay apparatus 10 shown in FIG. 1. The optical submarine cable system according to the present disclosure is configured to include optical submarine transmission systems of a plurality of series that are installed in parallel to one another. While FIG. 2 illustrates a case in which two optical transmission systems, that is, a first series and a second series, are included, the number of systems in the present disclosure is not limited to that described above and may be a desired number. For example, the optical submarine cable system according to the present disclosure may be composed of a plurality of series of systems at least including the optical transmission system that uses the wavelength band of the C band and the optical transmission system that uses the wavelength band of the L band.

That is, in this example embodiment shown in FIG. 2 including optical transmission systems of two series, the optical submarine transmission system of the first series is transmitted via a first series optical fiber 20a in the optical submarine cable 20, and the optical submarine transmission system of the second series is transmitted via a second series optical fiber 20b in the optical submarine cable 20. It is assumed that required current values that are required to drive LDs (semiconductor lasers) for excitation included in the optical submarine relay apparatus 10 are different from each other in order to excite and amplify the optical signal of the optical submarine transmission system of the first series and the optical signal of the optical submarine transmission system of the second series.

Note that the optical submarine relay apparatuses 10 arranged in multiple stages on the optical submarine cable 20 are composed of one internal configuration, and each of the optical submarine relay apparatuses 10 is configured to include at least an LD driving device for excitation 11, a multiplexer 12ab, a first multiplexer 12a, a first optical amplifier (EDFA) 13a, a second multiplexer 12b, and a second optical amplifier (EDFA) 13b, as shown in FIG. 2.

When the LD driving device for excitation 11 of the optical submarine relay apparatus 10 shown in FIG. 2 outputs a first excitation light and a second excitation light for performing amplification and excitation of the optical signals of the optical submarine transmission system of the first series and the optical submarine transmission system of the second series, the multiplexer 12ab multiplexes or demultiplexes the obtained light into the first excitation light and the second excitation light and outputs the first excitation light to the first multiplexer 12a and outputs the second excitation light to the second multiplexer 12b.

Then the optical signal of the optical submarine transmission system of the first series input from the first series optical fiber 20a is multiplexed with the first excitation light in the first multiplexer 12a, the first optical amplifier 13a is driven, the input optical signal is excited and amplified by the first optical amplifier 13a, and the resulting signal is output. In a similar way, the optical signal of the optical submarine transmission system of the second series input from the second series optical fiber 20b is multiplexed with the second excitation light in the second multiplexer 12b, the second optical amplifier 13b is driven, the input optical signal is excited and amplified by the second optical amplifier 13b, and the resulting signal is output.

Figure 3:
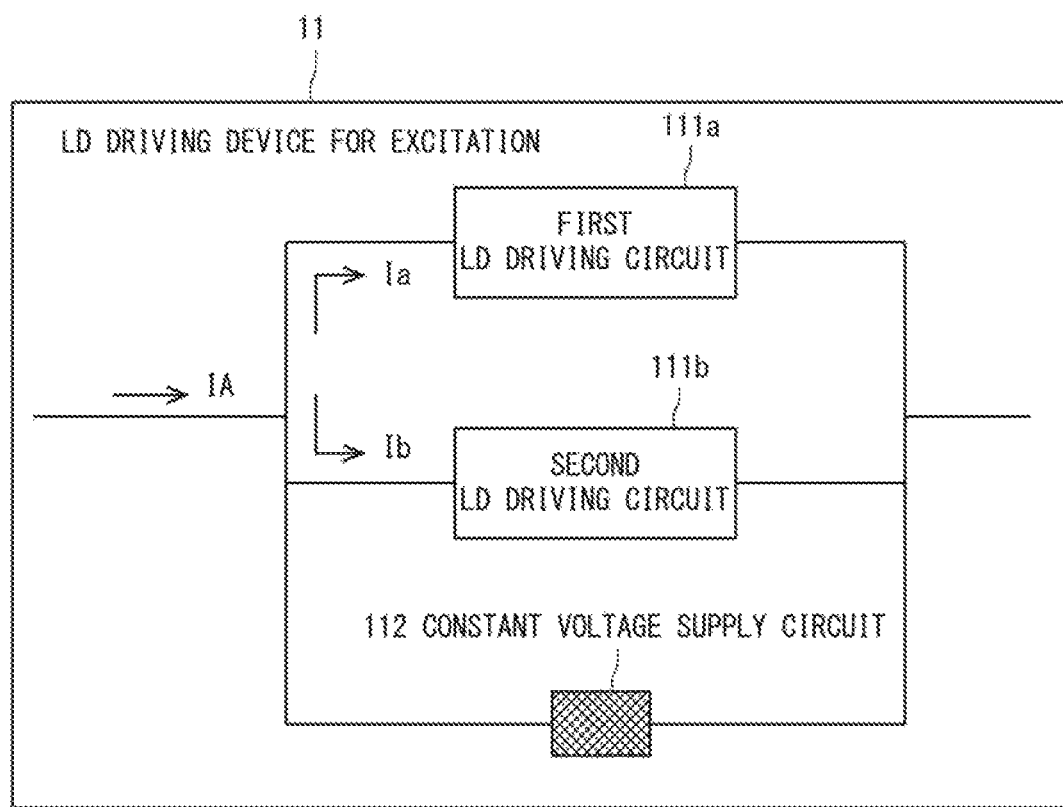
FIG. 3 is a block configuration diagram showing one example of an internal configuration of an LD driving device for excitation in the optical submarine relay apparatus shown in FIG. 2.

Next, one example of an internal configuration of the LD driving device for excitation 11 in the optical submarine relay apparatus 10 shown in FIG. 2 will be explained. FIG. 3 shows a block configuration diagram showing one example of the internal configuration of the LD driving device for excitation 11 in the optical submarine relay apparatus 10 shown in FIG. 2. As described above, the LD driving device for excitation 11 outputs both the first excitation light for performing amplification and excitation of the optical signal of the optical submarine transmission system of the first series and the second excitation light for performing amplification and excitation of the optical signal of the optical submarine transmission system of the second series.

As shown in FIG. 3, the LD driving device for excitation 11 is composed of a first LD driving circuit 111a, a second LD driving circuit 111b, and a constant voltage supply circuit 112. The first LD driving circuit 111a drives a Laser Diode (LD: a semiconductor laser) and outputs a predetermined first excitation light for exciting and driving the first optical amplifier 13a, and the second LD driving circuit 111b drives the LD and outputs a predetermined second excitation light for exciting and driving the second optical amplifier 13b. The constant voltage supply circuit 112 is a circuit for causing, when the system current $I_A$ fed from the power feeding equipment 31 in the land terminal equipment device 30 exceeds the total required current amount that is necessary to drive both the first LD driving circuit 111a and the second LD driving circuit 111b, this excessive current to flow through the constant voltage supply circuit 112 by bypass, and is formed so as to be parallel to the first LD driving circuit 111a and the second LD driving circuit 111b.

Here, while power is necessary to drive each of the LDs, as described above, the required current value Ia required to drive the first LD driving circuit 111a that outputs the first excitation light for the optical submarine transmission system of the first series and the required current value Ib required to drive the second LD driving circuit 111b that outputs the second excitation light for the optical submarine transmission system of the second series are different from each other. As shown in FIG. 3, in the LD driving device for excitation 11 according to this example embodiment, unlike the case of the current technology related to the present disclosure, when LD driving circuits whose required current values required to drive the LD driving circuits are different from each other are present regarding the LD driving circuits that output the respective excitation light beams, the power feeding lines of the respective LD driving devices, that is, the power feeding line of the first LD driving circuit 111a and that of the second LD driving circuit 111b are connected in parallel to each other, and the LD driving devices, that is, the first LD driving circuit 111a and the second LD driving circuit 111b, are configured to be driven at the same time. That is, as shown in FIG. 3, the power feeding lines of the first LD driving circuit 111a, the second LD driving circuit 111b, and the constant voltage supply circuit 112 are connected in parallel to one another.

Accordingly, for each of the optical submarine relay apparatuses 10 arranged for each relay section of the optical submarine cable 20, the first LD driving circuit 111a and the second LD driving circuit 111b are connected in parallel to each other. Therefore, the system current $I_A$ fed from the power feeding equipment 31 in the land terminal equipment device 30 via the optical submarine cable 20 is set to the one expressed by the following equation.

$$I_A = Ia + Ib$$

As a result, in any optical submarine relay apparatus 10 to which the optical submarine cable 20 is connected, unlike the case shown in FIG. 8 as the current technology related to the present disclosure, the consumption current Ia and the consumption current Ib respectively flow through the first LD driving circuit 111a and the second LD driving circuit 111b that are connected in parallel to each other in the LD driving device for excitation 11, and an excessive current that flows through the constant voltage supply circuit 112 does not occur, as shown in FIG. 3. Therefore, it is possible to efficiently utilize the system current of the optical submarine cable system and to reduce the required current for the whole optical submarine cable system. It is therefore possible to construct the optical submarine cable system that provides the long distance large capacity communication system.

Figure 4A:
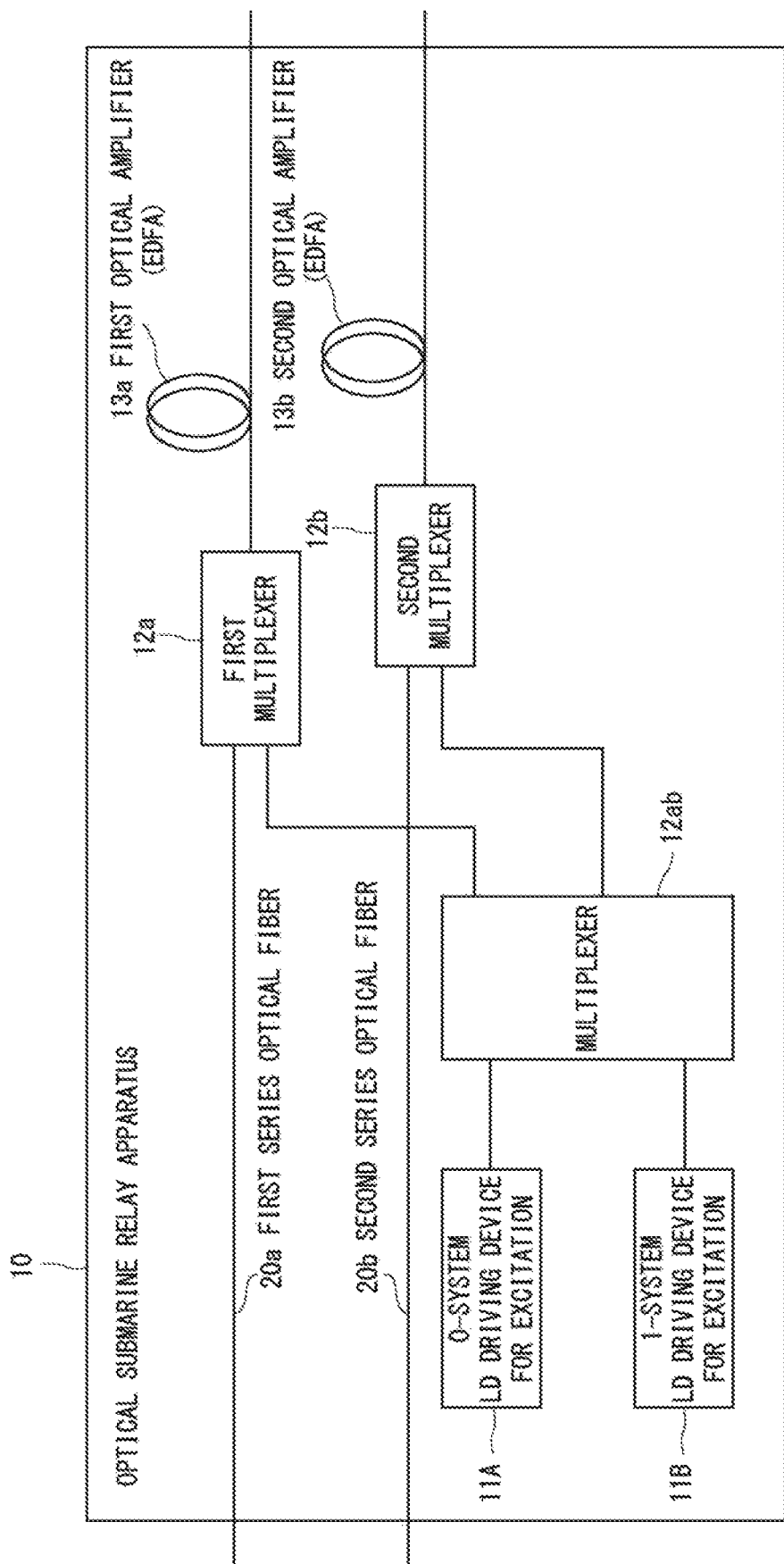
FIG. 4A is a configuration diagram showing a connection configuration example in a case in which the configuration of the LD driving device for excitation in the optical submarine relay apparatus shown in FIG. 2 is made redundant.

Next, a case in which the configuration of the LD driving device for excitation 11 is made redundant to be a duplex configuration in order to improve reliability of the submarine cable system will be explained. FIG. 4A is a configuration diagram showing a connection configuration example in a case in which the configuration of the LD driving device for excitation 11 in the optical submarine relay apparatus 10 shown in FIG. 2 is made redundant. FIG. 4A shows a connection configuration example in a case in which the duplex configuration of a 0-system LD driving device for excitation 11A and a 1-system LD driving device for excitation 11B is employed as the redundant configuration of the LD driving device for excitation, and shows a state in which the 0-system LD driving device for excitation 11A and the 1-system LD driving device for excitation 11B are connected to the multiplexer 12ab shown in FIG. 2. Further, FIG. 4B shows a connection state of the power feeding lines for the two devices of the 0-system LD driving device for excitation 11A and the 1-system LD driving device for excitation 11B shown in FIG. 4A.

The connection configuration shown in FIG. 4A is such that the 0-system LD driving device for excitation 11A and the 1-system LD driving device for excitation 11B having a duplex configuration are connected to the multiplexer 12ab in place of the LD driving device for excitation 11 shown in FIG. 2. The configurations of the other components are similar to those shown in FIG. 2. The multiplexer 12ab multiplexes/demultiplexes the excitation light output from one of the 0-system LD driving device for excitation 11A and the LD driving device for excitation 11B to output the resulting light to the corresponding first multiplexer 12a and second multiplexer 12b. Here, similar to the case described with reference to FIG. 3, the required current value Ia required to drive each of a 0-system first LD driving circuit 111aA and a 1-system first LD driving circuit 111aB that output the first excitation light for the optical submarine transmission system of the first series and the required current value Ib required to drive each of a 0-system second LD driving circuit 111bA and a 1-system second LD driving circuit 111bB that output the second excitation light for the optical submarine transmission system of the second series are different from each other.

Figure 4B:
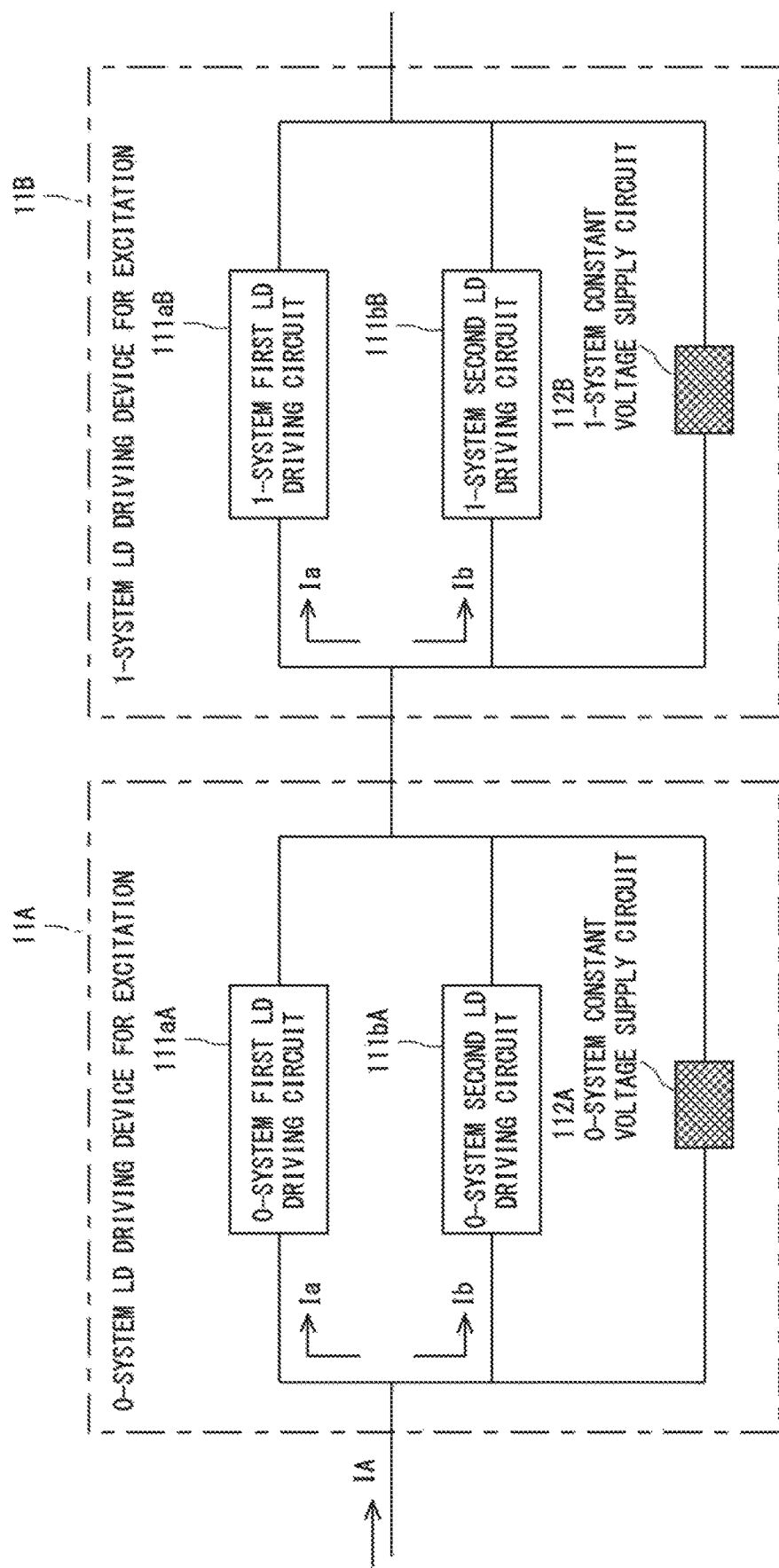
FIG. 4B is a configuration diagram showing a connection configuration example of a redundant LD driving device for excitation in the optical submarine relay apparatus in which the configuration of the LD driving device for excitation shown in FIG. 4A is made redundant.

Further, as shown in FIG. 4B, a current supply route (that is, a connection path of the power feeding lines) in each of the 0-system LD driving device for excitation 11A and the 1-system LD driving device for excitation 11B is configured in such a way that the 0-system first LD driving circuit 111aA, the 0-system second LD driving circuit 111bA, and the 0-system constant voltage supply circuit 112A are connected in parallel to one another, and the 1-system first LD driving circuit 111aB, the 1-system second LD driving circuit 111bB, and the 1-system constant voltage supply circuit 112B are connected in parallel to one another, similar to the case of the parallel connection configuration shown in FIG. 3. A current supply route (that is, a connection path of the power feeding lines) between the 0-system LD driving device for excitation 11A and the 1-system LD driving device for excitation 11B is configured in such a way that the power feeding lines are cascaded in series.

Therefore, in the case in which an LD driving devices for excitation having a duplex configuration are employed as well, similar to the case shown in FIG. 3, the system current $I_A$ fed from the power feeding equipment 31 in the land terminal equipment device 30 via the optical submarine cable 20 is set to the one expressed by the following equation, as shown in FIG. 4B, in any one of the 0-system LD driving device for excitation 11A and the 1-system LD driving device for excitation 11B.

$$I_A = Ia + Ib$$

As a result, in any optical submarine relay apparatus 10 to which the optical submarine cable 20 is connected, as shown in FIG. 4B, in the 0-system LD driving device for excitation 11A, the consumption current Ia and the consumption current Ib respectively flow through the 0-system first LD driving circuit 111a A and the 0-system second LD driving circuit 111bA in which the power feeding lines are connected in parallel to each other, and an excessive current that flows through the 0-system constant voltage supply circuit 112A does not occur. In a similar way, in the 1-system LD driving device for excitation 11B as well, the consumption current Ia and the consumption current Ib respectively flow through the 1-system first LD driving circuit 111aB and the 1-system second LD driving circuit 111bB in which the power feeding lines are connected in parallel to each other, and an excessive current that flows through the 1-system constant voltage supply circuit 112B does not occur.

Descriptions will be given in further detail. When an N-multiplexed (N: a natural number equal to or larger than 2) redundant configuration is employed as the LD driving circuits in a case in which the optical submarine relay apparatus that accommodates optical submarine transmission systems of a plurality of series is constructed, in the current technology related to the present disclosure as shown in FIG. 8, the following configuration is employed. That is, power feeding lines, the number of which corresponding to N, which is the redundant number, of the LD driving circuits for the optical submarine transmission systems of the same series, that is, the power feeding lines of the LD driving devices that require the same required current connected in parallel to one another, and the above power feeding lines, the number of which corresponding to the number of series (the number of systems), are cascade-connected. Therefore, an excessive current is generated in the LD driving circuit for the optical submarine transmission system of the series in which the required current is small, which results a wasteful power to be consumed. Further, a current obtained by multiplying the current that flows through the LD driving circuit for the optical submarine transmission system of the series whose required current is larger by the number of power feeding lines connected in parallel to each other, that is, N, ends up to be required as the system current of the whole optical submarine cable system.

On the other hand, in this example embodiment illustrated in FIG. 4B, when the redundant configuration of the LD driving circuits is applied, in a case in which LD driving devices that require different required currents are present, the following configuration is employed. That is, the power feeding lines, the number of which corresponding to the number of series (the number of systems), of the LD driving circuits for optical submarine transmission systems of different series, that is, the LD driving circuits for all the series including the LD driving circuits that require different required currents are connected in parallel to one another, and a redundant number, which is N, of the above power feeding lines are cascade-connected.

Therefore, unlike the current technology related to the present disclosure, no excessive current is generated, and it is possible to suppress the system current of the whole optical submarine cable system to a small current value compared to the current technology related to the present disclosure. Therefore, it is possible to efficiently utilize the system current of the optical submarine cable system and to reduce the required current for the whole optical submarine cable system. It is therefore possible to construct the optical submarine cable system that provides the long distance large capacity communication system.

Figure 5:
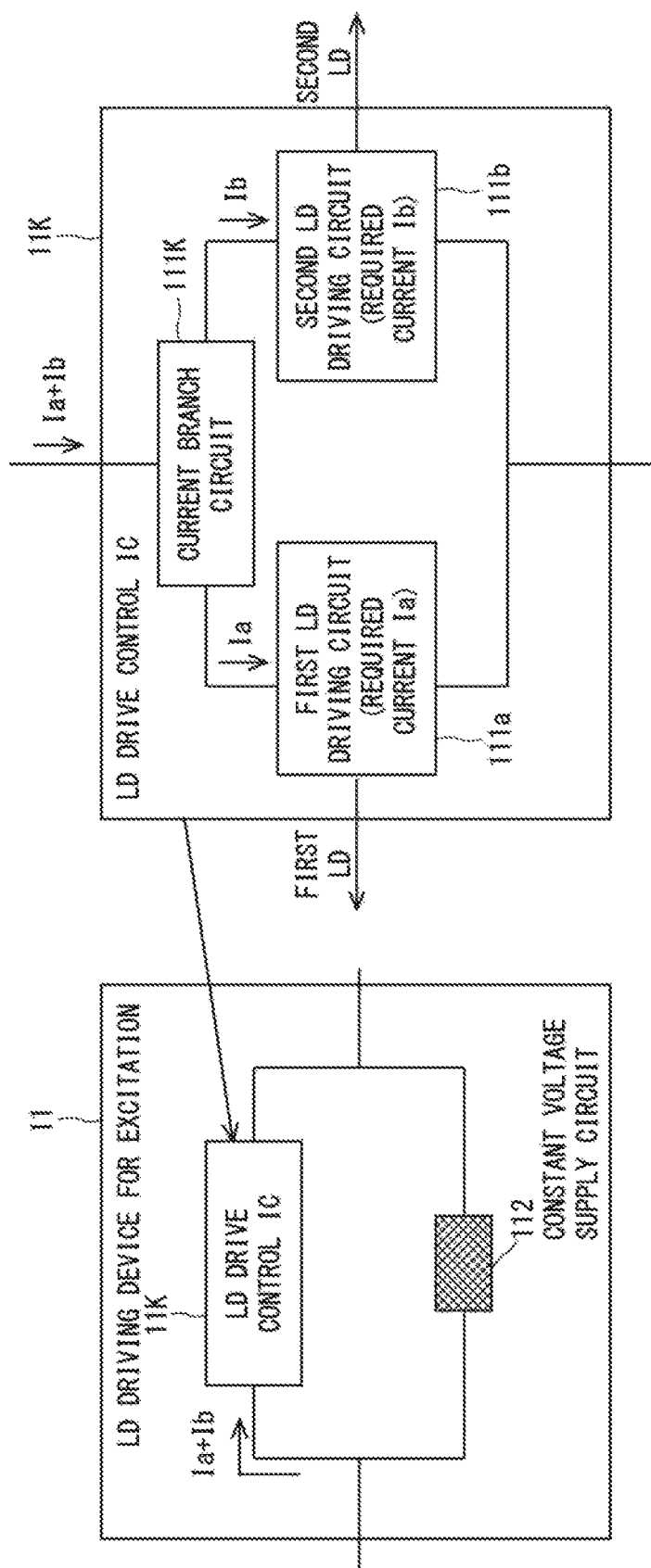
FIG. 5 is a block configuration diagram showing a modified example of the LD driving device for excitation in the optical submarine relay apparatus shown in FIG. 3.

Next, another configuration example of the optical submarine relay apparatus according to the present disclosure will be explained. That is, a modified example of the LD driving device for excitation 11 in the optical submarine relay apparatus 10 shown in FIG. 3 may include an LD drive control Integrated Circuit (IC) as shown in FIG. 5. FIG. 5 is a block configuration diagram showing a modified example of the LD driving device for excitation 11 in the optical submarine relay apparatus 10 shown in FIG. 3, and shows a case in which the LD driving device for excitation 11 includes an LD drive control IC at least including a current branch circuit for branching a current and feeding the branched currents to the respective LD driving circuits. In the configuration example shown in FIG. 5, an example in which the LD driving device for excitation 11 is composed of the LD drive control IC 11K and the constant voltage supply circuit 112 is shown.

The LD drive control IC 11K includes a current branch circuit 111K that divides a current having a current value (Ia+Ib) supplied from the power feeding line as a system current $I_A$ into the required current Ia to be input to the first LD driving circuit 111a and the required current Ib to be input to the second LD driving circuit 111b, and includes a first LD driving circuit 111a and a second LD driving circuit 111b connected to the respective power feeding lines that have been branched off on the output side of the current branch circuit 111K. However, as described above, in some cases, the LD drive control IC 11K may include only the current branch circuit 111K, and the first LD driving circuit 111a and the second LD driving circuit 111b may be externally connected to the respective power feeding lines that have been branched off. According to the aforementioned configuration, the first LD driving circuit 111a in the LD drive control IC 11K is able to drive the first LD by the driving current Ia branched off by the current branch circuit 111K and causes the first excitation light to be output, and the second LD driving circuit 111b is able to drive the second LD by the driving current Ib branched off by the current branch circuit 111K and causes the second excitation light to be output.

Further, while the case in which the number of series (systems) of the optical submarine transmission system accommodated in this submarine cable system is two has been described in the aforementioned example embodiments, it is needless to say that the present disclosure is not limited to the case in which the two systems are used and may also be applied to a case in which two or more series (systems) are used. Further, the number of LD driving devices provided for the optical transmission systems of one system is also not limited to one and the present disclosure can be applied to a case in which two or more LD driving devices are employed, similar to the case described above regarding the redundant configuration.

While the present disclosure has been described above with reference to the example embodiments, it is needless to say that the present disclosure is not limited thereto. Various changes that may be understood by one skilled in the art within the scope of the present disclosure may be made to the configuration and the details of the present disclosure.

This application is based upon and claims the benefit of priority from Japanese Patent Application No. 2017-052921, filed on Mar. 17, 2017, the disclosure of which is incorporated herein in its entirety by reference.

REFERENCE SIGNS LIST

OPTICAL SUBMARINE RELAY APPARATUS
10M OPTICAL SUBMARINE RELAY APPARATUS
10N OPTICAL SUBMARINE RELAY APPARATUS
11 LD DRIVING DEVICE FOR EXCITATION
11A 0-SYSTEM LD DRIVING DEVICE FOR EXCITATION
11B 1-SYSTEM LD DRIVING DEVICE FOR EXCITATION
11K LD DRIVE CONTROL IC
11M LD DRIVING DEVICE FOR EXCITATION
11Na1 LD DRIVING DEVICE FOR EXCITATION
11Na2 LD DRIVING DEVICE FOR EXCITATION
11Nb1 LD DRIVING DEVICE FOR EXCITATION
11Nb2 LD DRIVING DEVICE FOR EXCITATION
12M MULTIPLEXER
12NC MULTIPLEXER
12NL MULTIPLEXER
12NX MULTIPLEXER
12NY MULTIPLEXER
12Nab1 MULTIPLEXER
12Nab2 MULTIPLEXER
12$a$ FIRST MULTIPLEXER
12$ab$ MULTIPLEXER
12$b$ SECOND MULTIPLEXER
13M OPTICAL AMPLIFIER (EDFA: ERBIUM-DOPED FIBER AMPLIFIER)
13NC OPTICAL AMPLIFIER
13NL OPTICAL AMPLIFIER
13NX OPTICAL AMPLIFIER
13NY OPTICAL AMPLIFIER
13$a$ FIRST OPTICAL AMPLIFIER (EDFA)
13$b$ SECOND OPTICAL AMPLIFIER (EDFA)
20 OPTICAL SUBMARINE CABLE
20M OPTICAL SUBMARINE CABLE
20$a$ FIRST SERIES OPTICAL FIBER
20$b$ SECOND SERIES OPTICAL FIBER
LAND TERMINAL EQUIPMENT DEVICE
30M LAND TERMINAL EQUIPMENT DEVICE
31 POWER FEEDING EQUIPMENT
111$a$ FIRST LD DRIVING CIRCUIT
111$a$ A 0-SYSTEM FIRST LD DRIVING CIRCUIT
111$a$ B 1-SYSTEM FIRST LD DRIVING CIRCUIT
111$b$ SECOND LD DRIVING CIRCUIT
111$b$ A 0-SYSTEM SECOND LD DRIVING CIRCUIT
111$b$ B 1-SYSTEM SECOND LD DRIVING CIRCUIT
111C LD DRIVING CIRCUIT
111K CURRENT BRANCH CIRCUIT
111L LD DRIVING CIRCUIT
111M LD DRIVING CIRCUIT
112 CONSTANT VOLTAGE SUPPLY CIRCUIT
112A 0-SYSTEM CONSTANT VOLTAGE SUPPLY CIRCUIT
112B 1-SYSTEM CONSTANT VOLTAGE SUPPLY CIRCUIT
112C CONSTANT VOLTAGE SUPPLY CIRCUIT
112L CONSTANT VOLTAGE SUPPLY CIRCUIT
112M CONSTANT VOLTAGE SUPPLY CIRCUIT
$I_A$ SYSTEM CURRENT
Ia REQUIRED CURRENT VALUE
Ib REQUIRED CURRENT VALUE
$I_C$ CURRENT
$I_L$ CURRENT
$I_S$ EXCESSIVE CURRENT

What is claimed is:

1. An optical submarine cable system, wherein:
an optical submarine relay apparatus is arranged in each relay section of an optical submarine cable,
the optical submarine relay apparatus includes an optical amplifier and a Laser Diode (LD) driving device for excitation configured to output an excitation light for exciting the optical amplifier,
the LD driving device for excitation includes a plurality of LD driving circuits, and power feeding lines for feeding power to the plurality of respective LD driving circuits are connected in parallel to one another, and
a current supplied from the optical submarine cable is branched and supplied to the plurality of LD drive circuits through the power feeding lines.

2. The optical submarine cable system according to claim 1, wherein the LD driving device includes an LD driving circuit targeted for an optical signal of a wavelength band of a C band and an LD driving circuit targeted for an optical signal of a wavelength band of an L band.

3. The optical submarine cable system according to claim 1, wherein, in a redundant configuration in which each of the plurality of LD driving circuits is N-multiplexed (N: a natural number equal to or larger than 2), a redundant number, which is N, of power feeding lines for feeding power to the respective LD driving circuits connected in parallel to one another are cascade-connected.

4. The optical submarine cable system according to claim 1, comprising an LD drive control Integrated Circuit (IC) configured to include a current branch circuit, the current branch circuit branching a system current required for an entire system into currents that correspond to required currents required by the plurality of LD driving circuits and feeding power to the respective LD driving circuits.

5. An optical submarine relay apparatus, wherein:
the optical submarine relay apparatus is arranged in each relay section of an optical submarine cable in an optical submarine cable system,
the optical submarine relay apparatus includes an optical amplifier and a Laser Diode (LD) driving device for excitation for outputting an excitation light for exciting the optical amplifier,
the LD driving device for excitation includes a plurality of LD driving circuits, and power feeding lines for feeding power to the plurality of respective LD driving circuits are connected in parallel to one another, and a current supplied from the optical submarine cable is branched and supplied to the plurality of LD drive circuits through the power feeding lines.

6. The optical submarine relay apparatus according to claim 5, wherein the LD driving device includes an LD driving circuit targeted for an optical signal of a wavelength band of a C band and an LD driving circuit targeted for an optical signal of a wavelength band of an L band.

7. The optical submarine relay apparatus according to claim 5, wherein, in a redundant configuration in which each of the plurality of LD driving circuits is N-multiplexed (N: a natural number equal to or larger than 2), a redundant number, which is N, of power feeding lines for feeding power to the respective LD driving circuits connected in parallel to one another are cascade-connected.

8. The optical submarine relay apparatus according to claim 5, comprising an LD drive control Integrated Circuit (IC) configured to include a current branch circuit, the current branch circuit branching a system current required for an entire system into currents that correspond to required currents required by the plurality of LD driving circuits and feeding power to the respective LD driving circuits.

* * * * *